(12) United States Patent
Nawata et al.

(10) Patent No.: US 10,155,451 B2
(45) Date of Patent: Dec. 18, 2018

(54) HYBRID VEHICLE AND METHOD OF CONTROLLING THE SAME

(71) Applicant: TOYOTA JIDOSHA KABUSHIKI KAISHA, Toyota-shi, Aichi-ken (JP)

(72) Inventors: Hidekazu Nawata, Gotemba (JP); Toshio Inoue, Gotemba (JP); Keita Fukui, Fujinomiya (JP); Tomoaki Honda, Gotemba (JP); Yuta Niwa, Mishima (JP); Taichi Osawa, Susono (JP); Shunsuke Fushiki, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 72 days.

(21) Appl. No.: 15/128,177

(22) PCT Filed: Feb. 4, 2015

(86) PCT No.: PCT/JP2015/000495
§ 371 (c)(1),
(2) Date: Sep. 22, 2016

(87) PCT Pub. No.: WO2015/145938
PCT Pub. Date: Oct. 1, 2015

(65) Prior Publication Data
US 2017/0101023 A1   Apr. 13, 2017

(30) Foreign Application Priority Data
Mar. 27, 2014 (JP) .................. 2014-065451

(51) Int. Cl.
*B60L 11/18* (2006.01)
*B60K 6/46* (2007.10)
(Continued)

(52) U.S. Cl.
CPC .......... *B60L 11/1842* (2013.01); *B60K 6/445* (2013.01); *B60K 6/46* (2013.01);
(Continued)

(58) Field of Classification Search
None
See application file for complete search history.

(56) References Cited

U.S. PATENT DOCUMENTS

2010/0133900 A1*  6/2010  King ................. B60L 11/1816
                                                    307/9.1
2012/0187916 A1*  7/2012  Duer ................. B60L 11/1862
                                                    320/136

FOREIGN PATENT DOCUMENTS

JP    2001-231106    8/2001
JP    2013-189161    9/2013

* cited by examiner

*Primary Examiner* — Todd M Melton
*Assistant Examiner* — Jason R Roberson
(74) *Attorney, Agent, or Firm* — Finnegan, Henderson, Farabow, Garrett & Dunner, LLP

(57) ABSTRACT

A vehicle includes an engine and a battery, and is configured to perform external power feeding of supplying electric power to the outside of the vehicle. The vehicle includes an MG that generates electric power by using an output from the engine, and an ECU that controls the engine and the MG such that an SOC of the battery is maintained at a prescribed control center value. When an amount of remaining fuel of the engine falls below a prescribed reference amount during execution of the external power feeding, the ECU sets the control center value to a smaller value than when the amount of remaining fuel is not below the reference amount.

8 Claims, 4 Drawing Sheets

(51) Int. Cl.
*B60L 1/00* (2006.01)
*B60W 10/06* (2006.01)
*B60W 10/08* (2006.01)
*B60W 10/26* (2006.01)
*B60W 20/15* (2016.01)
*B60K 6/445* (2007.10)
*B60W 20/00* (2016.01)
*B60W 20/13* (2016.01)

(52) U.S. Cl.
CPC ............. *B60L 1/006* (2013.01); *B60W 10/06* (2013.01); *B60W 10/08* (2013.01); *B60W 10/26* (2013.01); *B60W 20/15* (2016.01); *B60W 20/00* (2013.01); *B60W 20/13* (2016.01); *B60W 2510/244* (2013.01); *B60W 2550/402* (2013.01); *B60W 2560/02* (2013.01); *B60W 2710/244* (2013.01); *B60Y 2200/92* (2013.01); *Y02T 10/6239* (2013.01); *Y02T 10/6269* (2013.01); *Y02T 10/6286* (2013.01); *Y10S 903/907* (2013.01); *Y10S 903/93* (2013.01)

HYBRID VEHICLE AND METHOD OF CONTROLLING THE SAME

CROSS-REFERENCE TO RELATED APPLICATIONS

This application is a national phase application of International Application No. PCT/JP2015/000495, filed Feb. 4, 2015, and claims the priority of Japanese Application No. 2014-065451, filed Mar. 27, 2014, the content of both of which is incorporated herein by reference.

TECHNICAL FIELD

The present invention relates to hybrid vehicles and methods of controlling the same, and more particularly to a hybrid vehicle configured to perform external power feeding of supplying electric power to the outside of the vehicle and a method of controlling the same.

BACKGROUND ART

Hybrid vehicles configured to perform external power feeding of supplying electric power to an electrical device and the like outside of the vehicle are known. Some of such hybrid vehicles can supply not only electric power stored in a vehicle-mounted battery, but also electric power generated by a power generator using motive power of an engine.

For example, a hybrid vehicle disclosed in Japanese Patent Laying-Open No. 2013-189161 (PTL 1) includes battery determination means for determining based on an SOC (State of Charge) of a battery whether or not electric power can be supplied from the battery to the outside of the vehicle, and fuel determination means for determining based on an amount of remaining fuel whether or not electric power can be supplied to the outside of the vehicle by activating a power generator with driving power of an engine. According to the hybrid vehicle disclosed in PTL 1, the electric power is not supplied when the SOC of the battery is low and the amount of remaining fuel is small. Consequently, the hybrid vehicle can be prevented from running out of fuel and being unable to run.

CITATION LIST

Patent Literature

[PTL 1] Japanese Patent Laying-Open No. 2013-189161

SUMMARY OF INVENTION

Technical Problem

Some of the hybrid vehicles configured to perform external power feeding have a running mode in which the SOC of a battery is maintained at a prescribed target value. In such a running mode, when the SOC falls below the target value, an engine is driven to recover the SOC to the target value with electric power generated by a power generator using an output from the engine.

Generally, engine efficiency is adjusted such that it is the highest during running when output power of the engine is moderately high. Output power of an engine required for external power feeding is often smaller than output power required for running of a vehicle. During the external power feeding, therefore, the engine is often driven at relatively low efficiency. Thus, there is a need for a technique of driving an engine at the highest possible efficiency to thereby efficiently use fuel in a hybrid vehicle configured to perform external power feeding.

The present invention has been made in order to solve the problem described above, and an object of the present invention is to provide a technique for efficiently using fuel in a hybrid vehicle configured to perform external power feeding.

Solution to Problem

A hybrid vehicle according to one aspect of the present invention includes an internal combustion engine and a power storage device, and is configured to perform external power feeding of supplying electric power to the outside of the vehicle. The hybrid vehicle includes a power generator that generates electric power by using an output from the internal combustion engine, and a control device that controls the internal combustion engine and the power generator such that an SOC of the power storage device is maintained at a prescribed target value. When an amount of remaining fuel of the internal combustion engine falls below a prescribed reference amount during execution of the external power feeding, the control device sets the target value to a smaller value than when the amount of remaining fuel is not below the reference amount.

A hybrid vehicle according to another aspect of the present invention includes an internal combustion engine and a power storage device, and is configured to perform external power feeding of supplying electric power to the outside of the vehicle. The hybrid vehicle includes a power generator that generates electric power by using an output from the internal combustion engine, and a control device that controls the internal combustion engine and the power generator such that an SOC of the power storage device is maintained within a prescribed control range. When an amount of remaining fuel of the internal combustion engine falls below a prescribed reference amount during execution of the external power feeding, the control device sets a lower limit value of the control range to a smaller value than when the amount of remaining fuel is not below the reference amount.

In a method of controlling a hybrid vehicle according to yet another aspect of the present invention, the hybrid vehicle includes a power storage device, an internal combustion engine, and a power generator that generates electric power by using an output from the internal combustion engine, and is configured to perform external power feeding of supplying electric power to the outside of the vehicle. The internal combustion engine and the power generator are controlled such that an SOC of the power storage device is maintained at a prescribed target value. The control method includes the steps of detecting an amount of remaining fuel of the internal combustion engine, and when the amount of remaining fuel falls below a prescribed reference amount during execution of the external power feeding, setting the target value to a smaller value than when the amount of remaining fuel is not below the reference amount.

The efficiency of the internal combustion engine is often relatively low during the external power feeding. According to the configuration and method described above, when the amount of remaining fuel falls below the reference amount during execution of the external power feeding, the control center value of the SOC (or the lower limit value of the control range) is set to a smaller value than when the amount of remaining fuel is not below the reference amount. Consequently, during the external power feeding, the electric power supply from the power storage device is preferentially performed until the SOC decreases further, and therefore, the internal combustion engine is less likely to be started. In other words, during the external power feeding, the electric power stored in the power storage device is preferentially supplied, thereby minimizing opportunities where the internal combustion engine is started at relatively low efficiency.

When the amount of remaining fuel falls below the reference amount, the vehicle will probably run to a fueling facility for refueling after execution of the external power feeding. Generally, the efficiency of the internal combustion engine during running is higher than the efficiency of the internal combustion engine during external power feeding. Accordingly, by driving the internal combustion engine to charge the power storage device during running when the efficiency of the internal combustion engine is relatively high, the fuel efficiency the fuel efficiency during recovery of the SOC can be improved.

Preferably, the reference amount is set based on a travel distance from a position of the hybrid vehicle during execution of the external power feeding to a fueling facility.

According to the configuration described above, fuel required for running to the fueling facility after execution of the external power feeding can be secured.

Advantageous Effects of Invention

According to the present invention, fuel can be efficiently used in a hybrid vehicle configured to perform external power feeding.

DESCRIPTION OF EMBODIMENTS

Figure 1:
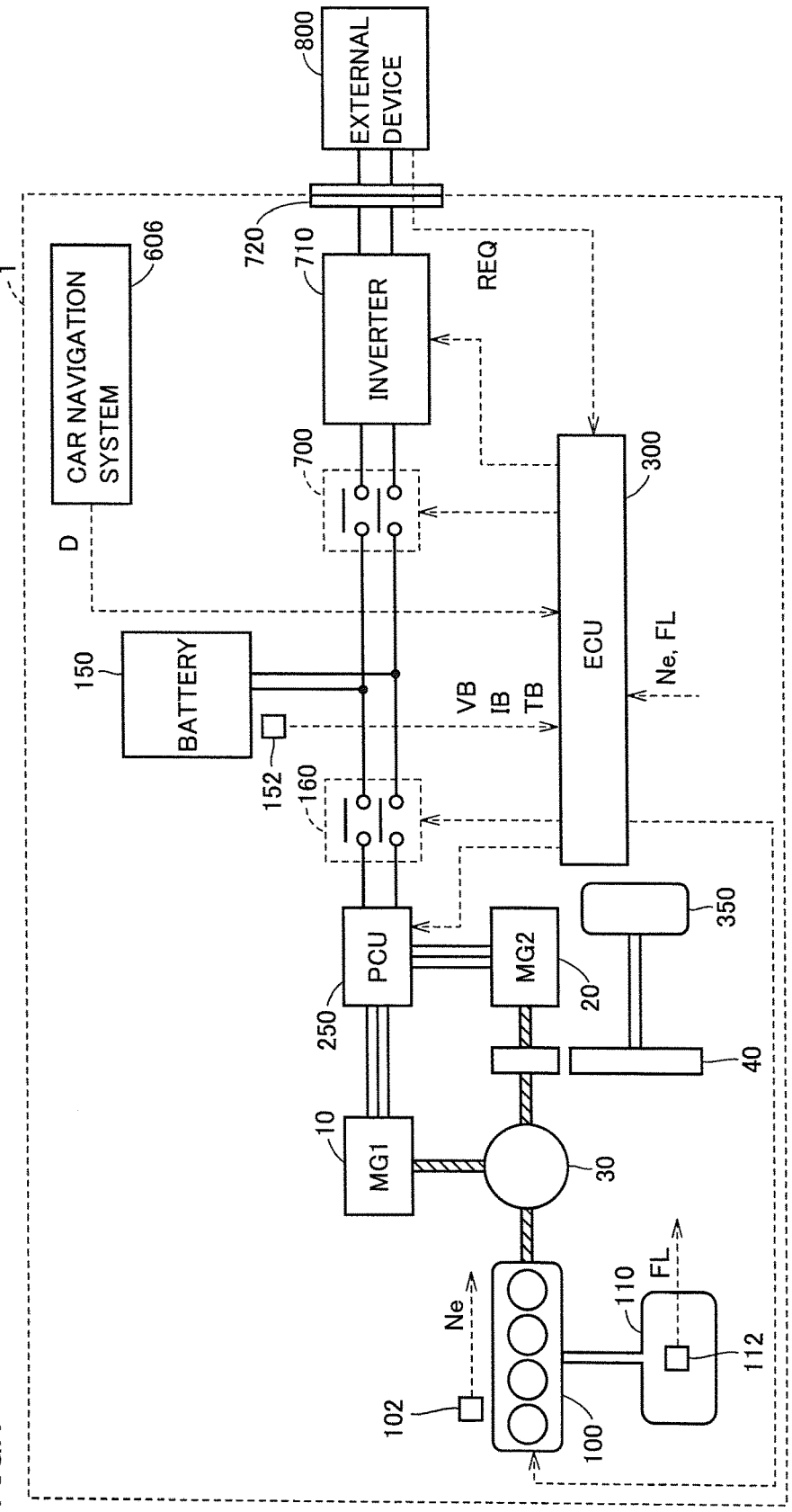
FIG. 1 is a block diagram schematically illustrating the configuration of a vehicle according to a first embodiment of the present invention.

Embodiments of the present invention will be described below in detail with reference to the drawings, in which the same or corresponding parts are designated by the same reference characters and description thereof will not be repeated.

First Embodiment

FIG. 1 is a block diagram schematically illustrating the configuration of a vehicle according to a first embodiment of the present invention. Referring to FIG. 1, a vehicle 1 is a hybrid vehicle including an engine 100, a battery 150, an MG (Motor Generator) 10, an MG 20, a power split device 30, a reduction gear 40, an SMR (System Main Relay) 160, a PCU (Power Control Unit) 250, an ECU (Electronic Control Unit) 300, and driving wheels 350.

Engine 100 is an internal combustion engine such as a gasoline engine or a diesel engine. Engine 100 outputs driving power for vehicle 1 to run based on control by ECU 300.

A crank position sensor 102 is provided in the vicinity of a crankshaft (not shown) of engine 100. Crank position sensor 102 detects a speed of engine 100 (hereinafter also referred to as engine speed) Ne, and outputs a result of the detection to ECU 300.

Engine 100 is connected to a fuel tank 110. Fuel tank 110 stores fuel of engine 100 such as gasoline, ethanol (liquid fuel) or propane gas (gaseous fuel). A fuel gauge 112 is provided within fuel tank 110. Fuel gauge 112 detects an amount of remaining fuel FL in fuel tank 110 and outputs a result of the detection to ECU 300.

Each of MG 10 and MG 20 is, for example, a three-phase alternating-current (AC) rotating electric machine including a rotor having a permanent magnet buried therein (neither shown). MG 10 causes rotation of the crankshaft (not shown) of engine 100 by using electric power of battery 150 to thereby start engine 100. MG 10 can also generate electric power by using an output from engine 100. AC power generated by MG 10 is converted to direct-current (DC) power by PCU 250 to charge battery 150. The AC power generated by MG 10 may be supplied to MG 20.

MG 20 generates driving power by using at least one of the electric power supplied from battery 150 and the electric power generated by MG 10. The driving power of MG 20 is transmitted to driving wheels 350. At the time of regenerative braking of the vehicle, kinetic energy of the vehicle is transmitted from driving wheels 350 to MG 20, to thereby drive MG 20. AC power generated by MG 20 is converted to DC power by PCU 250 to charge battery 150.

Power split device 30 divides the motive power generated by engine 100 into two paths of motive power. Motive power in one path is transmitted to driving wheels 350. Motive power in the other path is transmitted to MG 10. Power split device 30 is, for example, a planetary gear mechanism including a sun gear, pinion gears, a carrier, and a ring gear (none shown). Reduction gear 40 transmits the motive power from power split device 30 or MG 20 to driving wheels 350.

PCU 250 converts the DC power stored in battery 150 into AC power for supply to MG 10 and MG 20. PCU 250 also converts the AC power generated by MG 10 and MG 20 into DC power for supply to battery 150.

SMR 160 is provided on a path connecting battery 150 and PCU 250 to each other. SMR 160 switches between supply and interruption of electric power between battery 150 and PCU 250 based on control by ECU 300.

Battery 150 is a rechargeable power storage device. As battery 150, a secondary battery such as a nickel-metal hydride battery or a lithium-ion battery, or a capacitor such as an electric double layer capacitor can be employed.

Battery 150 is provided with a battery sensor 152. Battery sensor 152 collectively represents a current sensor, a voltage sensor and a temperature sensor (none shown). The voltage sensor detects a voltage VB of battery 150. The current sensor detects a current IB input to/output from battery 150. The temperature sensor detects a temperature TB of battery 150. Each sensor outputs a result of the detection to ECU 300. ECU 300 estimates an SOC of battery 150 based on voltage VB, current IB and temperature TB of battery 150.

Vehicle 1 is configured to perform external power feeding. As a configuration for the external power feeding, vehicle 1 further includes a relay 700, an inverter 710, and an outlet 720.

Relay 700 is provided on a path connecting battery 150 and inverter 710 to each other. Relay 700 switches between supply and interruption of electric power between battery 150 and inverter 710 based on control by ECU 300.

During the external power feeding, inverter 710 is electrically connected to an electrical device outside of the vehicle (external device) 800 through outlet 720, and relay 700 is closed. In response to a power feeding request signal REQ from external device 800, ECU 300 controls inverter 710 such that the DC power from battery 150 or the DC power generated by MG 10 is converted into AC power for supply to external device 800.

Vehicle 1 further includes a car navigation system 606. Car navigation system 606 obtains a travel route from a current position of vehicle 1 to a destination. Car navigation system 606 also calculates a travel distance D of that travel route and outputs a result of the calculation to ECU 300.

ECU 300 includes a CPU (Central Processing Unit), a memory, and a buffer (none shown). ECU 300 controls the devices so as to attain a desired state of vehicle 1 based on the signals transmitted from the sensors, and a map and a program stored in the memory.

Vehicle 1 has a CS (Charge Sustaining) mode as a running mode. The CS mode is a mode in which the SOC is maintained at a prescribed target value (or within a prescribed control range).

Figure 2:
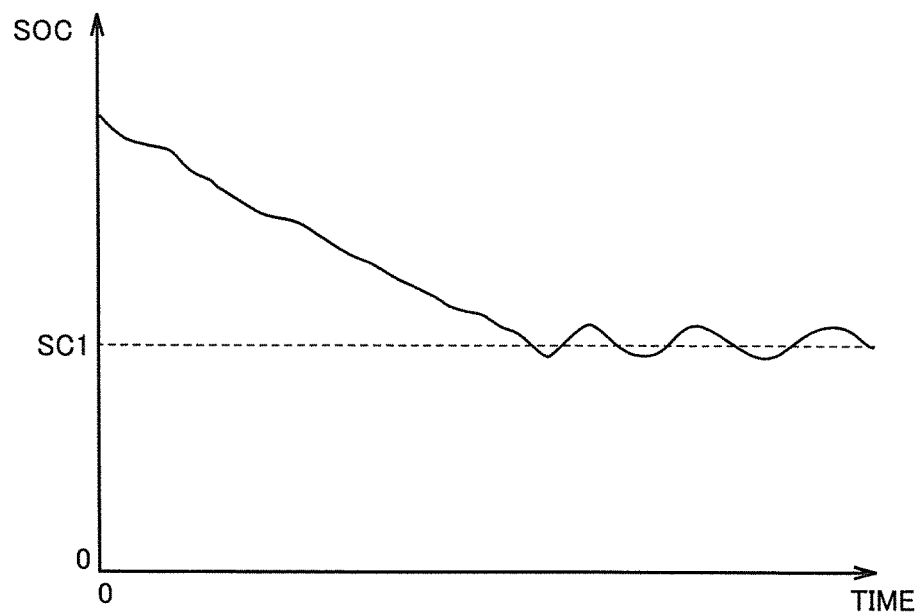
FIG. 2 is a diagram illustrating a CS mode.

FIG. 2 is a diagram illustrating the CS mode. Referring to FIG. 2, the horizontal axis represents time and the vertical axis represents the SOC of battery 150. In the first embodiment, the SOC is maintained at a control center value SC1 when the CS mode is selected. More specifically, the electric power is supplied from battery 150 until the SOC decreases to control center value SC1. When the SOC falls below control center value SC1, engine 100 is started so as to recover and maintain the SOC at control center value SC1. Consequently, battery 150 is charged with the electric power generated by MG 10. When the SOC recovers and rises above control center value SC1, engine 100 is stopped again.

Here, power which is output from engine 100 (engine output power) during the external power feeding is expressed as the sum of charging power for battery 150 and electric power supplied to external device 800. On the other hand, the engine output power during running is expressed as the sum of charging power for battery 150 and power used for running of vehicle 1 (running power).

In most cases, the electric power supplied to external device 800 is smaller than the running power. Accordingly, when the charging power for battery 150 during the external power feeding and the charging power for battery 150 during running are equal, the engine output power during the external power feeding is smaller than the engine output power during running.

Generally, engine efficiency (energy efficiency of converting thermal energy into kinetic energy) is adjusted such that it is the highest during running when the engine output power is moderately high. Since the engine output power during the external power feeding is often smaller than the engine output power during running, the engine efficiency during the external power feeding is often lower than the engine efficiency during running.

As the engine efficiency is relatively low during the external power feeding in this manner, it is difficult to recover the SOC at high fuel efficiency (ratio of amount of fuel consumption to amount of recovery of the SOC). Thus, if the engine is driven to generate power during the external power feeding, total fuel efficiency may be lowered.

On the other hand, when the amount of remaining fuel falls below a prescribed reference amount due to the external power feeding, the vehicle will probably run to a fueling facility such as a gas station for refueling after execution of the external power feeding. As such, there is an opportunity to recover the SOC by driving the engine during running when the engine efficiency is relatively high, without recovering the SOC immediately during execution of the external power feeding.

In the first embodiment, therefore, when amount of remaining fuel FL falls below a prescribed reference amount Vc during execution of the external power feeding, the control center value of the SOC is set to a smaller value than when amount of remaining fuel FL is not below reference amount Vc (hereinafter also referred to as normal time).

Consequently, the electric power supply from battery 150 is preferentially performed until the SOC decreases further, and therefore, engine 100 is less likely to be started during the external power feeding. In other words, during the external power feeding, the electric power stored in battery 150 is preferentially supplied, thereby minimizing opportunities where engine 100 is driven at relatively low efficiency. Then, engine 100 is driven to charge battery 150 during running when the engine efficiency is relatively high, thereby recovering the SOC at high fuel efficiency.

Figure 3:
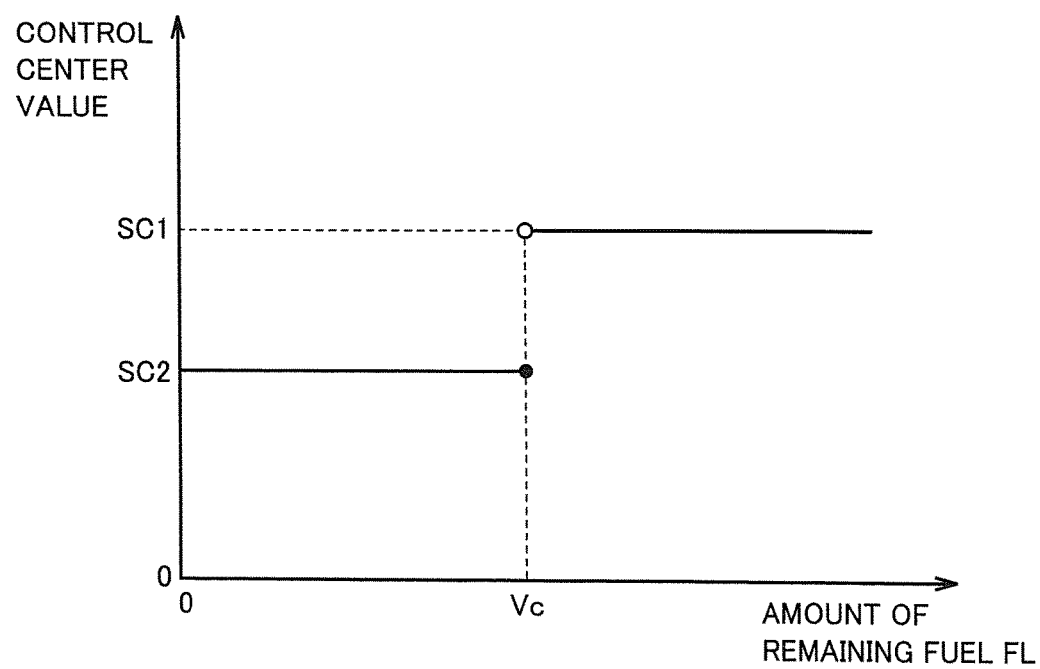
FIG. 3 is a diagram illustrating a control center value of an SOC in the first embodiment.

FIG. 3 is a diagram illustrating the control center value of the SOC in the first embodiment. Referring to FIG. 3, the horizontal axis represents amount of remaining fuel FL and the vertical axis represents the control center value of the SOC. When amount of remaining fuel FL is greater than reference amount Vc during execution of the external power feeding, the control center value is set to SC1. When amount of remaining fuel FL is equal to or smaller than reference amount Vc during execution of the external power feeding, on the other hand, the control center value is set to SC2 smaller than SC1.

Figure 4:
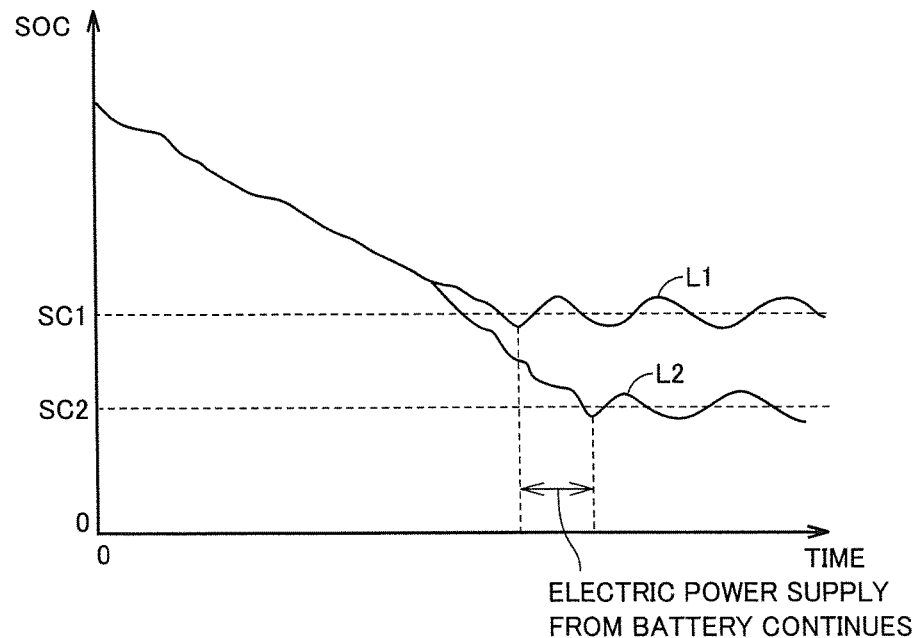
FIG. 4 is a diagram comparing control of maintaining the SOC at the control center value between different control center values.

FIG. 4 is a diagram comparing the control of maintaining the SOC at the control center value between different control center values SC1 and SC2. Referring to FIG. 4, the horizontal axis represents time and the vertical axis represents the SOC of battery 150.

When amount of remaining fuel FL is greater than reference amount Vc during execution of the external power feeding, charge and discharge of battery 150 is controlled such that the SOC is maintained at control center value SC1, as indicated by a curve L1. When amount of remaining fuel FL is equal to or smaller than reference amount Vc, on the other hand, charge and discharge of battery 150 is controlled such that the SOC is maintained at control center value SC2, as indicated by a curve L2.

By setting the control center value to SC2 smaller than SC1, the electric power supply from battery 150 is preferentially performed during a period of time when the SOC decreases from SC1 to SC2, and therefore, engine 100 is not started. Consequently, opportunities where engine 100 is driven during the external power feeding when the engine efficiency is lower than during running can be reduced.

As described above, when amount of remaining fuel FL is equal to or smaller than reference amount Vc, the vehicle will probably run to a fueling facility after execution of the external power feeding. The control center value of the SOC during this running is reset to control center value SC1 during the normal time. Thus, engine 100 can be driven to charge battery 150 during running when the engine efficiency is relatively high. Accordingly, the fuel efficiency during recovery of the SOC can be improved.

Figure 5:
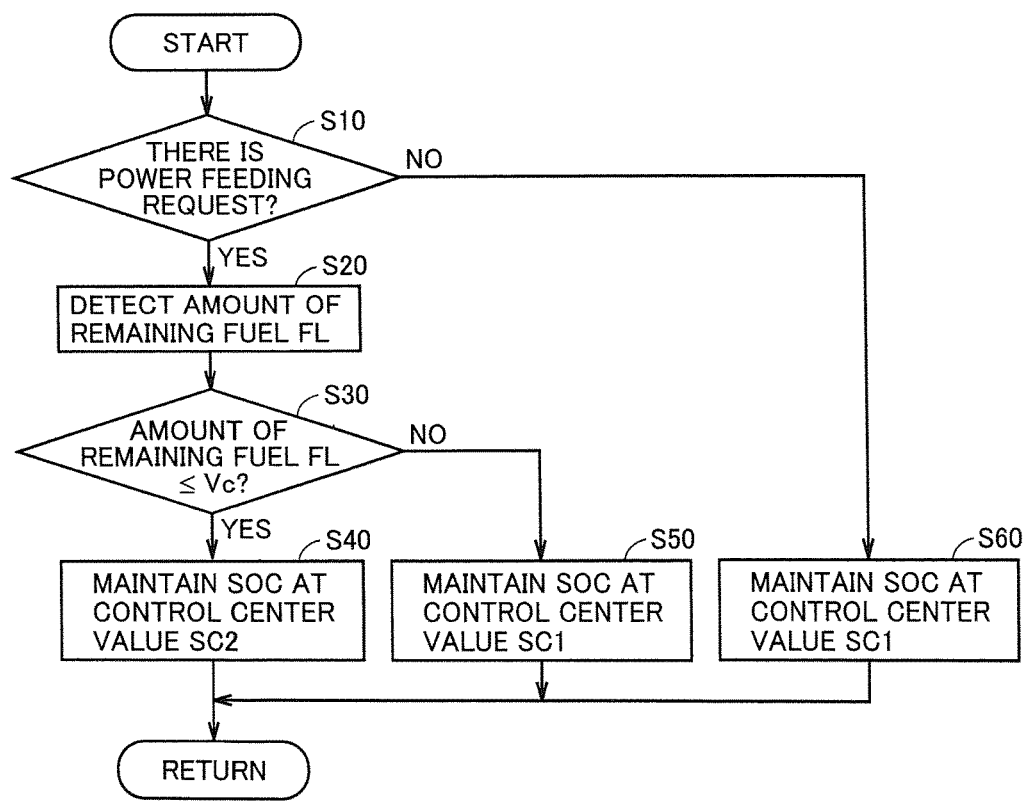
FIG. 5 is a flowchart illustrating a method of setting the control center value of the SOC in the first embodiment.

FIG. 5 is a flowchart illustrating a method of setting the control center value of the SOC in the first embodiment. This flowchart is called from a main routine for execution when a prescribed condition is satisfied or at regular time intervals. While the steps of this flowchart are basically implemented through software processing by ECU 300, they may be implemented through hardware processing by an electronic circuit fabricated within ECU 300.

Referring to FIGS. 1 and 5, in step S10, ECU 300 determines whether or not external power feeding is to be performed (or whether or not external power feeding is being performed). More specifically, ECU 300 determines that external power feeding is to be performed when power feeding request signal REQ is received from external device 800.

When the external power feeding is not to be performed (NO in step S10), ECU 300 sets the control center value of the SOC to SC1. Then, ECU 300 controls engine 100 and MG 10 such that the SOC is maintained at control center value SC1 (step S60).

When the external power feeding is to be performed (YES in step S10), ECU 300 causes fuel gauge 112 to detect amount of remaining fuel FL (step S20). Then, ECU 300 determines whether or not amount of remaining fuel FL is equal to or smaller than reference amount Vc (step S30).

When amount of remaining fuel FL is greater than reference amount Vc (NO in step S30), ECU 300 continues to use control center value SC1. ECU 300 controls charge and discharge of battery 150 such that the SOC is maintained at control center value SC1 (step S50).

When amount of remaining fuel FL is equal to or smaller than reference amount Vc (YES in step S30), on the other hand, ECU 300 sets the control center value of the SOC to SC2 smaller than SC1. Then, ECU 300 controls charge and discharge of battery 150 such that the SOC is maintained at control center value SC2 (step S40). When the process in step S40, step S50 or step S60 ends, the process returns to the main routine.

In this manner, according to the first embodiment, when amount of remaining fuel FL is small (or is running low) during execution of the external power feeding, the control center value of the SOC is set to a smaller value than when a sufficient amount of fuel remains. Consequently, the electric power supply from battery 150 is preferentially performed until the SOC decreases further, thus reducing opportunities where engine 100 is started. In other words, during the external power feeding, the electric power stored in battery 150 is preferentially supplied, thereby minimizing opportunities where engine 100 is driven at relatively low efficiency. Then, engine 100 is driven to charge battery 150 during running when the engine efficiency is relatively high, thereby improving the fuel efficiency during recovery of the SOC.

In order to reduce opportunities where engine 100 is started during the external power feeding, the control center value of the SOC may be set to SC2 during the external power feeding regardless of amount of remaining fuel FL. If the control center value is set to SC2, however, as shown in FIG. 4, the SOC decreases in a greater amount from an initial state (state at time 0 in FIG. 4) than when the control center value is set to SC1. When the battery is discharged with such a great amount of decrease in SOC, the deterioration of battery 150 may be hastened. Accordingly, it is desirable to minimize opportunities to set the control center value of the SOC to SC2, so as to suppress the deterioration of battery 150. For this reason, the control center value of the SOC is set to SC2 in this embodiment only when amount of remaining fuel FL is equal to lower than reference amount Vc. This is because there is an opportunity in this case to recover the SOC during running after execution of the external power feeding.

It is preferable that reference amount Vc of amount of remaining fuel FL be set based on travel distance D from a position of vehicle 1 during execution of the external power feeding to a nearby (e.g., nearest) fueling facility. Travel distance D can be obtained by means of car navigation system 606. Consequently, fuel required for running to the fueling facility after execution of the external power feeding can be secured. Alternatively, without consideration of such circumstances, a value of amount of remaining fuel FL when a fuel gauge (not shown) indicates an E (empty) level, for example, may be employed as reference amount Vc. Even when the fuel gauge indicates the E level, a certain amount (e.g., 10 liters in the case of gasoline) of fuel remains in fuel tank 110, which can be used for running to the fueling facility.

This embodiment has described an example where, when amount of remaining fuel FL is equal to or smaller than reference amount Vc, the control center value is reduced in a step-like manner as compared to when amount of remaining fuel FL is greater than reference amount Vc, as shown in FIG. 3. However, the control center value is not limited to be set this way, but may be set so as to vary linearly or in a curved manner.

Second Embodiment

While the first embodiment has described an example where the SOC is maintained at the control center value, a prescribed control range may be used instead of the control center value when controlling the SOC. A second embodiment describes an example where charge and discharge of the battery is controlled such that the SOC is maintained within a control range. In this control, the engine is started so as to recover the SOC when the SOC falls below a lower limit value of the control range, while the engine is stopped when the SOC rises above an upper limit value of the control range. It is noted that the configuration of a vehicle according to the second embodiment is the same as that of vehicle 1 shown in FIG. 1, and thus detailed description thereof will not be repeated.

Figure 6:
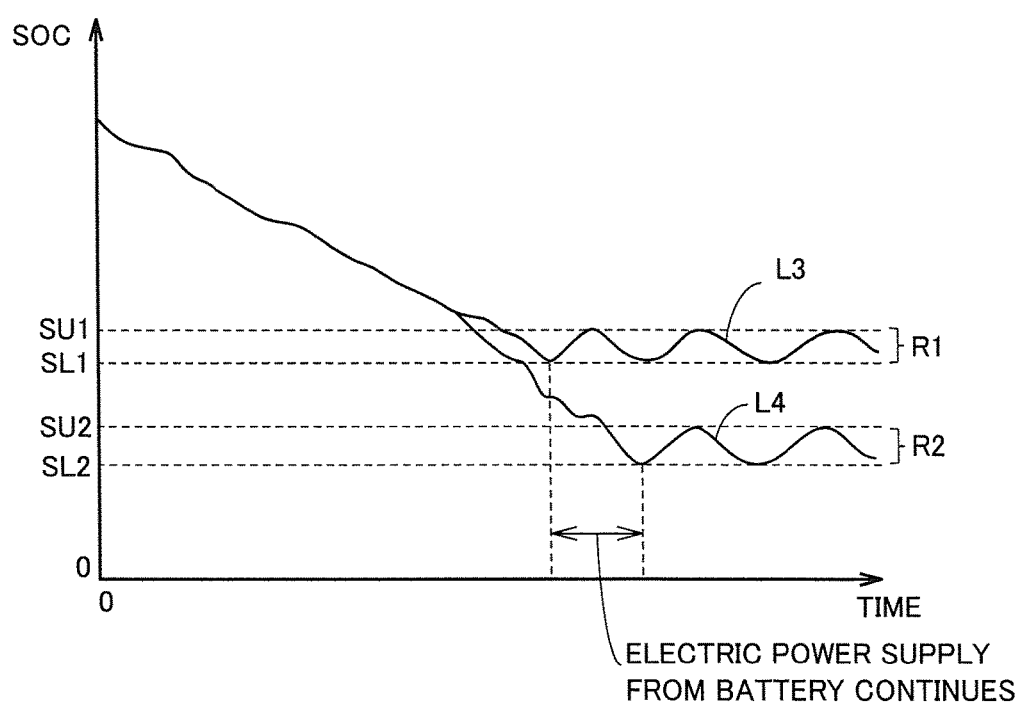
FIG. 6 is a diagram comparing control of maintaining the SOC within a control range between different control ranges.

FIG. 6 is a diagram comparing control of maintaining the SOC within a control range between different control ranges R1 and R2. Referring to FIG. 6, during the normal time, charge and discharge of battery 150 is controlled such that the SOC is maintained within a control range R1, as indicated by a curve L3. When amount of remaining fuel FL is equal to or smaller than reference amount Vc during execution of the external power feeding, on the other hand, charge and discharge of battery 150 is controlled such that the SOC is maintained within a control range R2, as indicated by a curve L4.

A lower limit value SL2 of control range R2 is smaller than a lower limit value SL1 of control range R1. Consequently, the electric power supply from battery 150 is preferentially performed until the SOC decreases from lower limit value SL1 to lower limit value SL2, thus reducing opportunities where engine 100 is started. In other words, during the external power feeding, the electric power stored in battery 150 is preferentially supplied, thereby minimizing opportunities where engine 100 is driven at relatively low efficiency. Then, engine 100 is driven to charge battery 150 during running when the engine efficiency is relatively high, thereby improving the fuel efficiency during recovery of the SOC.

A flowchart in the second embodiment is the same as the flowchart shown in FIG. 5 except that the SOC is maintained within the control range rather than being maintained at the control center value, and thus detailed description thereof will not be repeated.

In the example shown in FIG. 6, an upper limit value SU2 of control range R2 is smaller than an upper limit value SU1 of control range R1. However, since a period of time when the electric power supply from battery 150 is preferentially performed and the starting of engine 100 is prevented is obtained if lower limit value SL2 is smaller than lower limit value SL1, a method of setting the upper limit value of the control range is not particularly limited. Upper limit value SU2 may be equal to upper limit value SU1.

Although the CS mode has been described as an example in the description of the first and second embodiments, the running mode to which the present invention can be applied is not limited to the CS mode as long as the SOC is maintained at a prescribed target value or within a control range.

Lastly, the embodiments will be summarized with reference to FIG. 1 again. Vehicle 1 includes engine 100 and battery 150, and is configured to perform external power feeding of supplying electric power to the outside of the vehicle. Vehicle 1 includes MG 10 that generates electric power by using an output from engine 100, and ECU 300 that controls engine 100 and MG 10 such that the SOC of battery 150 is maintained at prescribed control center values SC1, SC2. When amount of remaining fuel FL of engine 100 falls below prescribed reference amount Vc during execution of the external power feeding, ECU 300 sets the control center value (control center value SC2) to a smaller value than when amount of remaining fuel FL is not below reference amount Vc.

Vehicle 1 includes engine 100 and battery 150, and is configured to perform external power feeding of supplying electric power to the outside of the vehicle. Vehicle 1 includes MG 10 that generates electric power by using an output from engine 100, and ECU 300 that controls engine 100 and MG 10 such that the SOC of battery 150 is maintained within prescribed control ranges R1, R2. When amount of remaining fuel FL of engine 100 falls below prescribed reference amount Vc during execution of the external power feeding, ECU 300 sets the lower limit value (lower limit value SL2) of the control range to a smaller value than when amount of remaining fuel FL is not below reference amount Vc.

Preferably, reference amount Vc is set based on travel distance D from a position of vehicle 1 during execution of the external power feeding to a fueling facility.

In a method of controlling vehicle 1, vehicle 1 includes battery 150, engine 100, and MG 10 that generates electric power by using an output from engine 100, and is configured to perform external power feeding of supplying electric power to the outside of the vehicle. Engine 100 and MG 10 are controlled such that the SOC of battery 150 is maintained at prescribed control center values SC1, SC2. The control method includes step S20 of detecting amount of remaining fuel FL of engine 100, and step S40 of setting, when amount of remaining fuel FL falls below prescribed reference amount Vc during execution of the external power feeding, the control center value (control center value SC2) to a smaller value than when amount of remaining fuel FL is not below reference amount Vc.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 vehicle; 10, 20 MG; 30 power split device; 40 reduction gear; 100 engine; 102 crank position sensor; 110 fuel tank; 112 fuel gauge; 150 battery; 152 battery sensor; 160 SMR; 250 PCU; 300 ECU; 350 driving wheel; 606 car navigation system; 700 relay; 710 inverter; 720 outlet; 800 external device.

The invention claimed is:

1. A hybrid vehicle including an internal combustion engine and a power storage device, and being configured to perform external power feeding of supplying electric power to the outside of the hybrid vehicle, the hybrid vehicle comprising:
   a power generator that generates electric power by using an output from the internal combustion engine; and
   a control device configured to control the internal combustion engine and the power generator such that a state of charge of the power storage device is maintained at a target value, the target value being set to a first value when an amount of remaining fuel of the internal combustion engine is not below a reference amount during execution of the external power feeding,
   wherein, when the amount of remaining fuel falls below the reference amount during execution of the external power feeding, the control device is configured to set the target value to a second value, the second value being smaller than the first value, and
   wherein, the target value is set to the first value when the external power feeding is not.

2. The hybrid vehicle according to claim 1, wherein the reference amount is set based on a travel distance from a position of the hybrid vehicle during execution of the external power feeding to a fueling facility.

3. A hybrid vehicle including an internal combustion engine and a power storage device, and being configured to perform external power feeding of supplying electric power to the outside of the hybrid vehicle, the hybrid vehicle comprising:
   a power generator that generates electric power by using an output from the internal combustion engine; and
   a control device configured to control the internal combustion engine and the power generator such that a state of charge of the power storage device is maintained within a control range, the control range comprising a lower limit value being set to a first value when an amount of remaining fuel of the internal combustion engine is not below a reference amount during execution of the external power feeding,
   wherein, when the amount of remaining fuel falls below the reference amount during execution of the external power feeding, the control device is configured to set the lower limit value of the control range to a second value, the second value being smaller than the first value, and
   wherein, the lower limit value is set to the first value when the external power feeding is not performed.

4. The hybrid vehicle according to claim 3, wherein the reference amount is set based on a travel distance from a position of the hybrid vehicle during execution of the external power feeding to a fueling facility.

5. A method of controlling a hybrid vehicle, the hybrid vehicle including a power storage device, an internal combustion engine, and a power generator, the power generator generating electric power by using an output from the internal combustion engine, the hybrid vehicle being configured to perform external power feeding of supplying electric power to the outside of the hybrid vehicle, the internal combustion engine and the power generator being controlled such that a state of charge of the power storage device is maintained at a target value, the method comprising:

detecting an amount of remaining fuel of the internal combustion engine;

setting the target value to a first value when the amount of remaining fuel is not below a reference amount during execution of the external power feeding;

when the amount of remaining fuel falls below the reference amount during execution of the external power feeding, setting the target value to a second value, the second value being smaller than the first value; and setting the target value to the first value when the external power feeding is not performed.

6. The method according to claim 5, further comprising:

setting the reference amount based on a travel distance from a position of the hybrid vehicle during execution of the external power feeding to a fueling facility.

7. A method of controlling a hybrid vehicle, the hybrid vehicle including a power storage device, an internal combustion engine, and a power generator, the power generator generating electric power by using an output from the internal combustion engine, the hybrid vehicle being configured to perform external power feeding of supplying electric power to the outside of the hybrid vehicle, the internal combustion engine and the power generator being controlled such that a state of charge of the power storage device is maintained within a control range, the method comprising:

detecting an amount of remaining fuel of the internal combustion engine;

setting a lower limit value of the control range to a first value when an amount of remaining fuel is not below a reference amount during execution of the external power feeding;

when the amount of remaining fuel falls below the reference amount during execution of the external power feeding, setting the lower limit value of the control range to a second value, the second value being smaller than the first value; and setting a lower limit value of the control range to the first value when the external power feeding is not performed.

8. The method according to claim 7, further comprising:

setting the reference amount based on a travel distance from a position of the hybrid vehicle during execution of the external power feeding to a fueling facility.

\* \* \* \* \*